Aug. 18, 1953 L. H. MORIN 2,649,200
MACHINE FOR RACKING CHANNELLIKE DEVICES
Filed Oct. 7, 1948 5 Sheets-Sheet 1
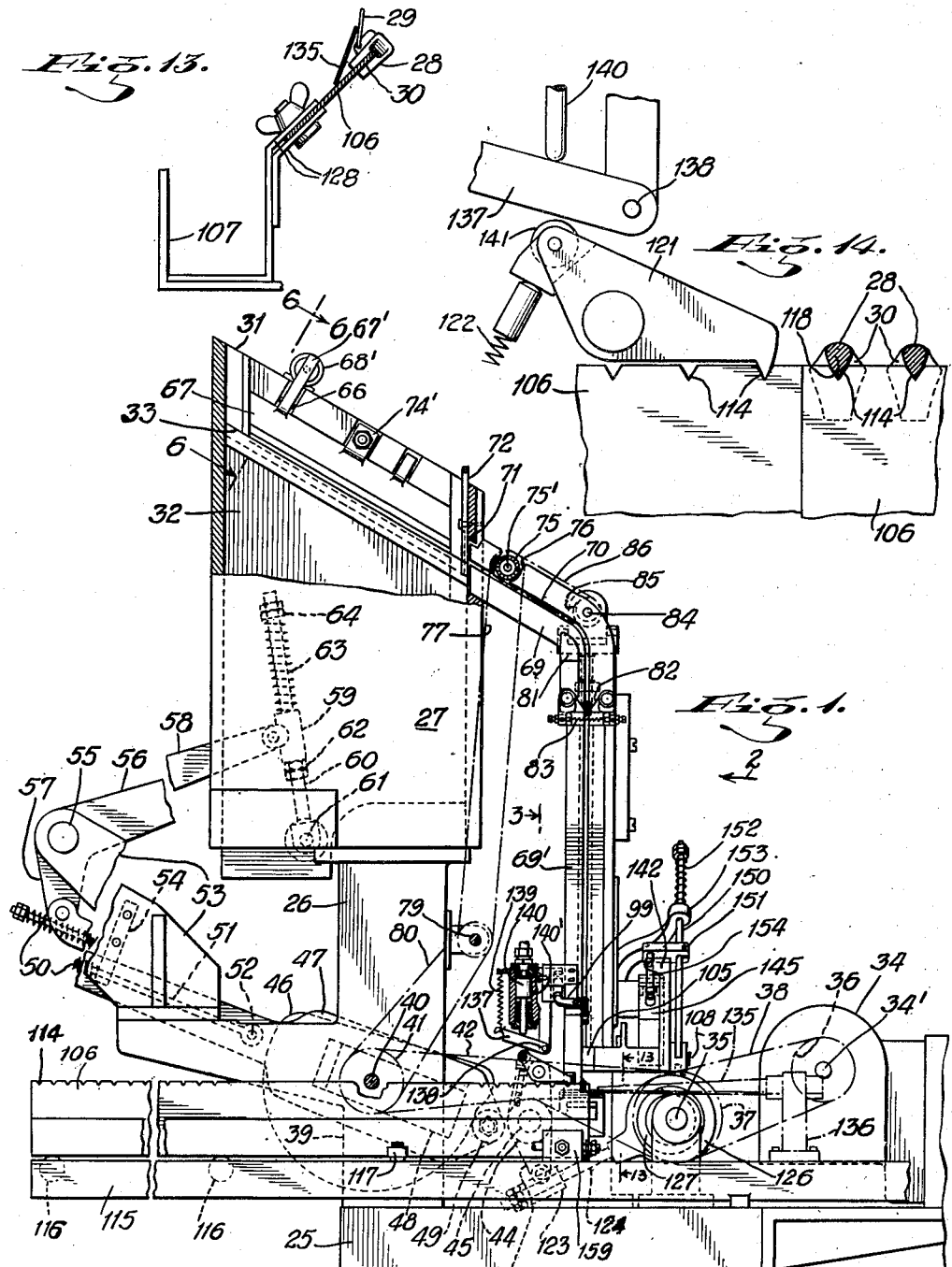
INVENTOR
LOUIS H. MORIN
BY
ATTORNEY Aug. 18, 1953 L. H. MORIN 2,649,200
MACHINE FOR RACKING CHANNELLIKE DEVICES
Filed Oct. 7, 1948 5 Sheets-Sheet 2
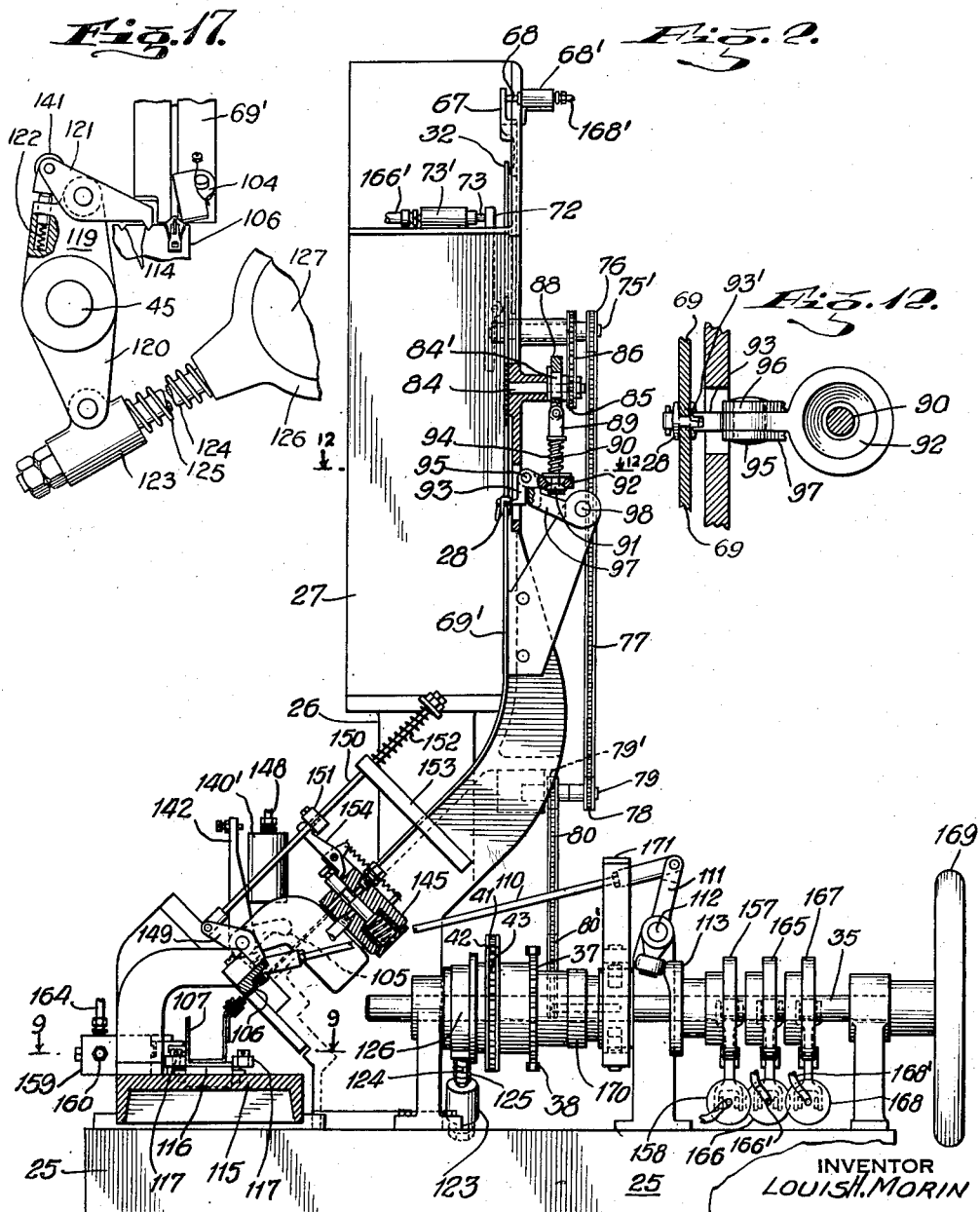
INVENTOR
LOUIS H. MORIN
BY
ATTORNEY Aug. 18, 1953          L. H. MORIN          2,649,200
MACHINE FOR RACKING CHANNELLIKE DEVICES
Filed Oct. 7, 1948          5 Sheets-Sheet 3
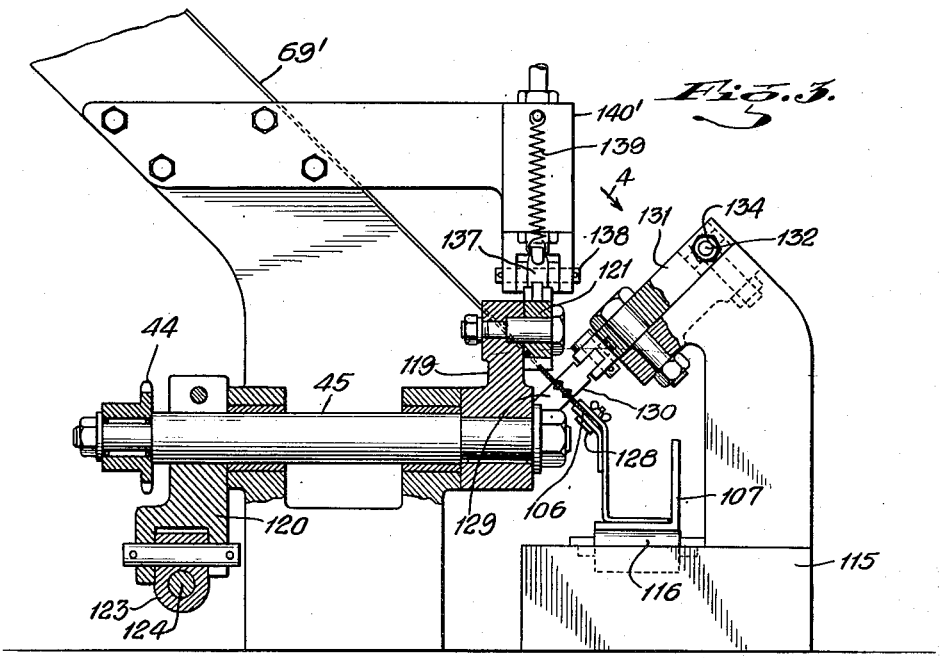
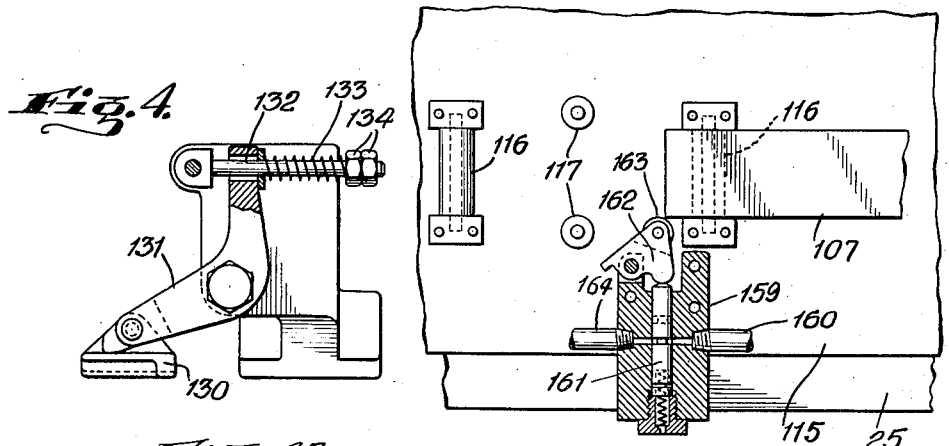
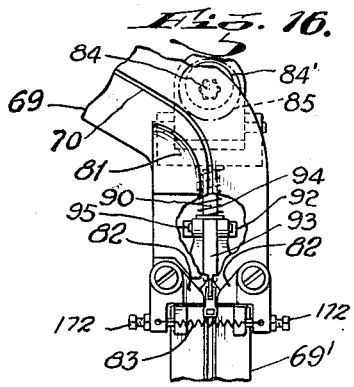
INVENTOR
LOUIS H. MORIN
BY
Howard C. Thompson
ATTORNEY Aug. 18, 1953  L. H. MORIN  2,649,200
MACHINE FOR RACKING CHANNELLIKE DEVICES
Filed Oct. 7, 1948  5 Sheets-Sheet 4
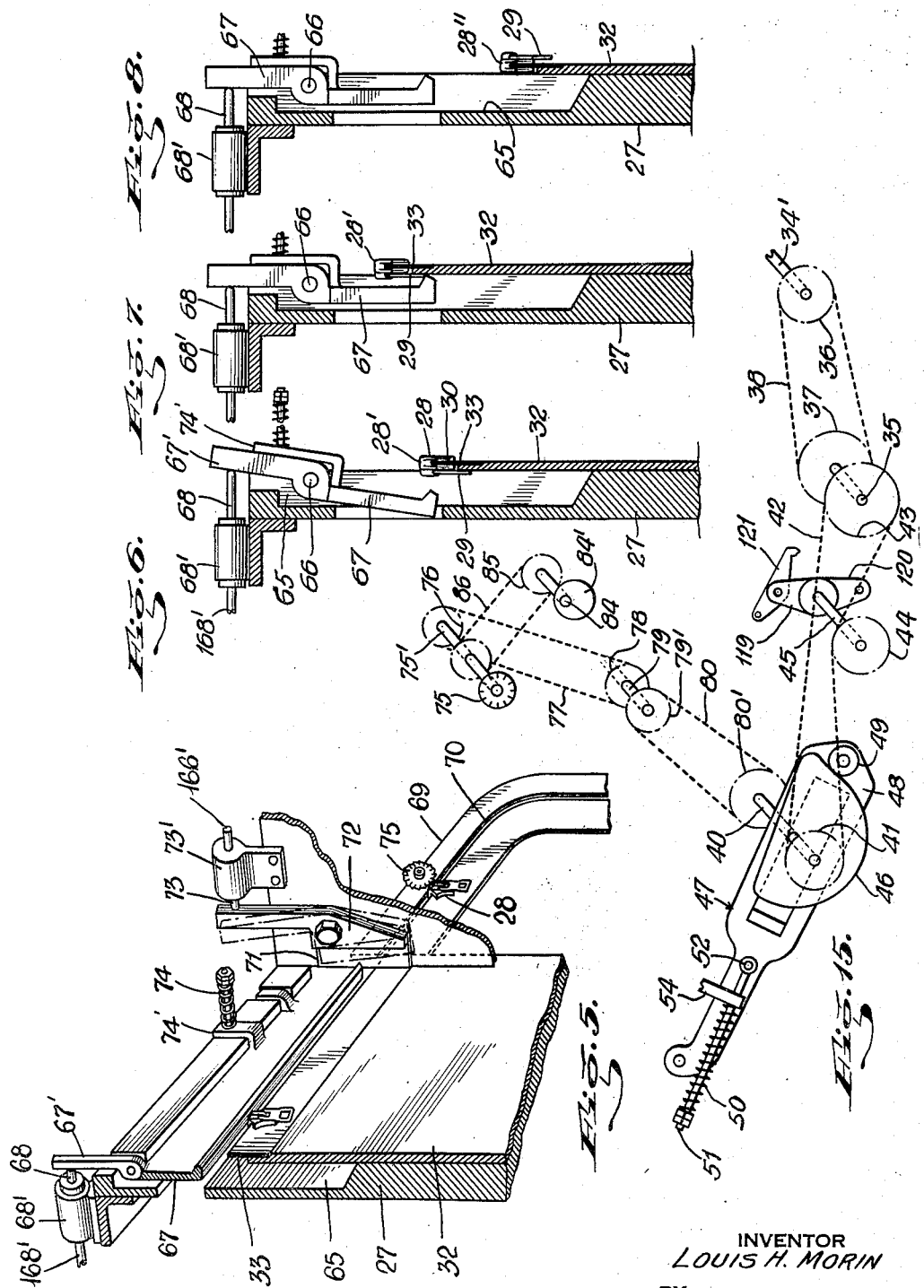
INVENTOR
LOUIS H. MORIN
BY
Howard P. Thompson
ATTORNEY Aug. 18, 1953 — L. H. MORIN — 2,649,200
MACHINE FOR RACKING CHANNELLIKE DEVICES
Filed Oct. 7, 1948 — 5 Sheets-Sheet 5
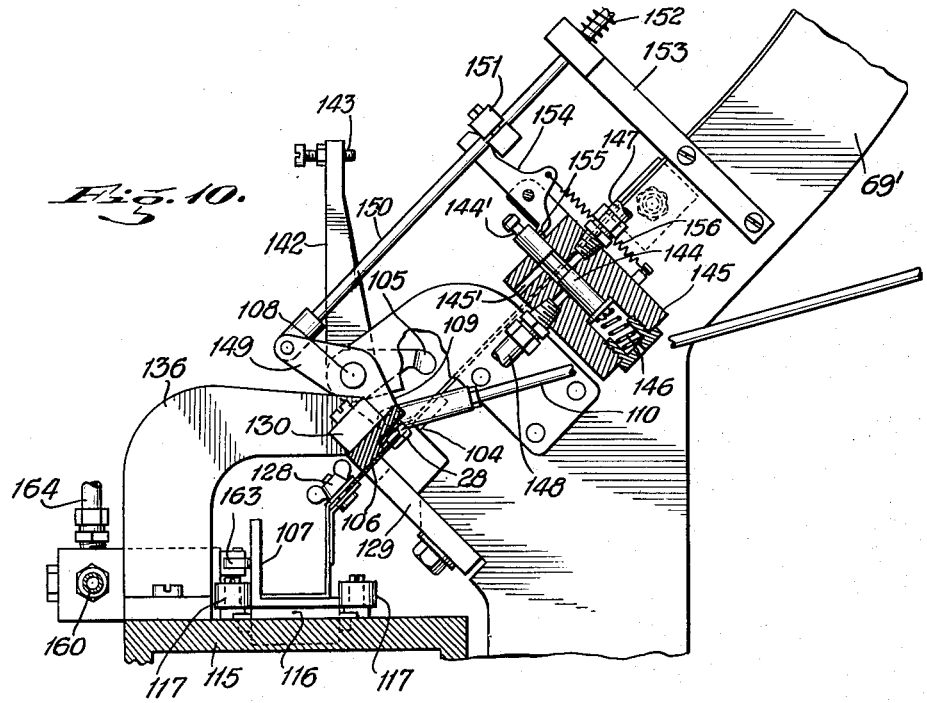
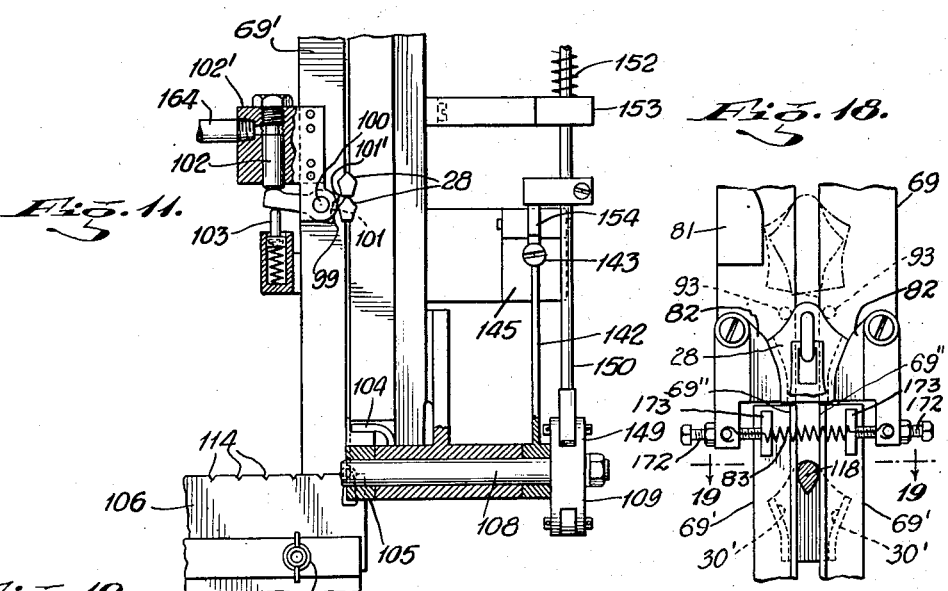
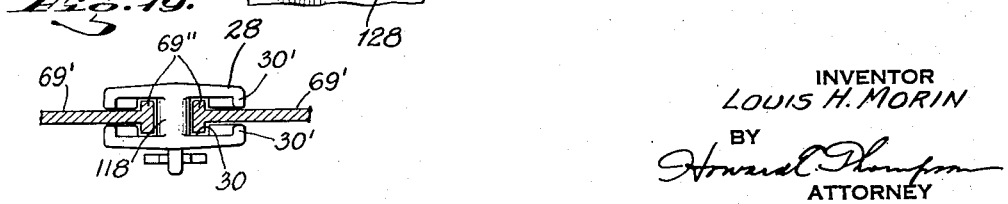
INVENTOR
LOUIS H. MORIN
BY
Howard Thompson
ATTORNEY Patented Aug. 18, 1953

2,649,200

UNITED STATES PATENT OFFICE 2,649,200

MACHINE FOR RACKING CHANNELLIKE DEVICES

Louis H. Morin, Bronx, N. Y.

Application October 7, 1948, Serial No. 53,255

18 Claims. (Cl. 209—72)

This invention relates to machines for automatically loading channel-like devices, such for example as separable fastener stringer sliders, at spaced intervals along a rack for the purpose of supporting said devices for the purpose of enamelling or otherwise coating the same. More particularly, the invention deals with a machine of the character described, wherein devices of the kind defined are automatically picked up in a hopper and fed to a delivery chute, means being provided in the hopper for ejecting devices which have been inaccurately positioned on the feed means, so that all devices are delivered to the chute in a common position.

Still more particularly, the invention deals with a machine of the character defined, wherein means is disposed along the delivery chute for controlling positioning of the devices in the chute and for controlling one by one discharge of the devices onto a rack, and, still more particularly, the invention deals with a machine of the character described, wherein a rack is intermittently fed to bring predetermined spaced sections thereof into position for reception of the respective devices.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a front view of the machine with parts of the construction broken away and with parts in section.

Fig. 2 is a view looking in the direction of the arrow 2 of Fig. 1, with parts of the construction broken away and in section.

Fig. 3 is a detail section substantially on the line 3—3 of Fig. 1 on an enlarged scale.

Fig. 4 is a view looking in the direction of the arrow 4 of Fig. 3 showing part of the construction.

Fig. 5 is a perspective and sectional view of a portion of the hopper, showing the device pick-up blade and indicating parts in different positions in dotted lines.

Figs. 6, 7 and 8 are diagrammatic sectional views, illustrating the operation of the mechanism for ejecting misplaced devices on the pick-up blade, the sections being substantially on the line 6—6 of Fig. 1.

Fig. 9 is a plan section on the line 9—9 of Fig. 2.

Fig. 10 is a view like Fig. 2 showing, on an enlarged scale, escapement and wiper mechanism of the machine.

Fig. 11 is a plan view of the structure, as seen in Fig. 10.

Fig. 12 is a section on the broken line 12—12 of Fig. 2 on an enlarged scale.

Fig. 13 is a partial section on the line 13—13 of Fig. 1, showing the pull turner device.

Fig. 14 is an enlarged detail view of adjacent ends of racks with the mounting of the slider in the groove or notch of the rack blade.

Fig. 15 is a diagrammatic view showing drives to various shafts of the machine.

Fig. 16 is an enlarged detail view of part of the construction shown in Fig. 1.

Fig. 17 is a diagrammatic detail vew of part of the rack feed mechanism.

Fig. 18 is an enlarged diagrammatic view similar to Fig. 16 showing transmission of sliders from chute 69 to chute 69'; and Fig. 19 is a partial section on the line 19—19 of Fig. 18.

My invention deals with a machine which is adapted to arrange a plurality of devices in spaced relationship to each other on a rack, whereby the filled racks can be moved to other stations where the devices can be coated with enamel or other coating material, which may be sprayed on the devices so that at least all exposed surfaces of the devices will be coated.

In practice, a series of racks will be utilized in the machine, each rack having means for detachably supporting a blade, on which the devices are arranged, so that a substantially continuous uninterrupted process can be provided, that is to say, a sufficient number of racks will be employed to carry out a continued process from the applicator or coating station to a drying or heater station, after which the devices are removed from the rack, the rack cleaned to remove enamel or coating material therefrom and, then, returned to the machine for reception of other devices.

In the present application, I am concerned primarily with the machine for loading the racks with the devices and, in illustrating an adaptation and use of the machine, I have shown, in the accompanying drawings, the same applied to the racking of sliders of separable fasteners, the sliders comprising channeled bodies having a pull, pivoted on one wall thereof.

With devices of this type and kind, it is essential to guide the devices through the chute and, finally, onto the rack with all of the devices in one position. To accomplish this result, I have provided, in the hopper, means for automatically picking up sliders and for ejecting, from the pick-up means, sliders which are in the wrong position thereon, whereby all sliders, delivered to the chute leading from the hopper, will be in common arrangement. Each rack employed in the machine is in the form of a channeled bar, having an article supporting blade detachably clamped thereon. The blade has longitudinally spaced notches for definitely positioning articles on the blade and said notches are utilized to intermittently feed the blade into positions for receiving successive devices delivered from the machine.

Various mechanisms of the machine are controlled through a series of air valves suitably timed for operation to provide the continuous and synchronized operation which will be more clearly hereinafter set forth.

In the accompanying drawing, I have shown at 25 the table of the machine, on an upstanding frame 26 of which is disposed a large box-shaped container 27, in which the devices to be racked are adapted to be placed. In the present illustration, the devices are in the form of separable fastener sliders 28 and are in the form of channeled bodies, having finger-pieces or pulls 29, pivoted on one wall thereof, the channel of the slider being designated by the reference character 30. The upper end of the container 27 has an inclined wall 31. Disposed within the container is a workpiece or slider pick-up member 32 which is disposed adjacent one wall of the casing, the member having an upper inclined blade edge 33, upon which the sliders 28 are adapted to be arranged in movement of the member 32 in said container.

On the table of the machine is an electric motor and gear reduction unit 34 which drives a cam shaft 35 through a chain and sprocket construction, namely a sprocket 36 on the motor shaft 34', a sprocket 37 on the cam shaft and a chain 38 engaging said sprockets, note Fig. 1. Suitably supported in a frame 39 on the machine is a shaft 40, on which is arranged a sprocket 41. Around the sprocket 41 passes a chain 42, which passes around another sprocket 43 on the cam shaft, the chain 42 passing over an idler sprocket 44 on a stud shaft 45 supported in the frame of the machine, note Fig. 1. The idler 44 tensions the chains and also clears the chain from the mechanism of the machine.

Mounted on the shaft 40 is a cam 46, for actuating a lever 47, having an O-end 48 spanning the shaft 40, the lever supporting, at its end, a roller 49 constantly held in engagement with the cam by a spring 50 supported on a rod 51, pivoted to the lever 47, as seen at 52. On a bracket 53 of the frame is arranged a spring stop 54. Pivoted in the bracket 53, as seen at 55, is a rocker 56, to the short arm 57 of which is pivoted the lever 47, the long arm 58 of the lever having a sliding mounting, as at 59, on a rod 60 pivoted to the lower end of the workpiece pick-up member 32, as seen at 61. Mounted on the rod 60 are adjustable stop screws 62 and the coil spring 63, the tension of which is adjusted by nuts 64. It will thus be seen that upward and downward movement of the member 32 and its blade 33 is controlled through the arm 47 and lever 56 by actuation of the cam 46. The entire drive is through tensional means so as to be semi-positive. The stroke of the member 32 is sufficient to bring the blade 33 deeply into the container to give ample opportunity to pick up several devices 28 in each upward movement of the blade 33.

Pivotally mounted in a recessed portion 65, as seen at 56, is a hook-shaped ejector finger 67 supported in the position shown in Fig. 6 by an air actuated plunger 68 to facilitate free upward movement of the blade 33 with the devices 28 arranged thereon.

In Figs. 6 and 7, the device 28' is shown supported with the pull 29 of the device in the wrong position for proper delivery to the chute of the machine. A properly supported device is shown at 28" in Fig. 8 of the drawing, where the pull 29 is in the proper position. It will appear, from Fig. 7 of the drawing, that as the member 32 starts to descend, the air actuated plunger 68 is retracted and the hook-shaped finger 67 is moved into the position shown in Fig. 7 by a spring 74 operating on an offset 74'. The finger 67, in this position, will engage the pull 29 of one or more sliders to automatically eject, or strip, the same from the blade 33 so that, when the blade reaches a lowered position, that is to say, a position in alinement with the upper part 69 of the magazine of the delivery chute, the sliders 28, on the blade 33 will feed by gravity into the channel 70 of the magazine.

Where the magazine 69 registers with the casing 27, the casing has a gate opening 71 which is normally closed by a pivoted gate device 72. At 73 is shown an air actuated plunger for moving the gate member 72 into opened position to allow the sliders to enter the channel 70.

Considering Fig. 5 of the drawing, it will be apparent that the finger 67 is in the form of an elongated plate extending the full length of the blade 33 and the plunger 68 operates on an arm extension 67' on said finger; see Fig. 5.

Rotatably mounted in the magazine is a tooth-wheel 75, for engaging the sliders as they enter the channel 70 to properly set or position the devices in the channel. The tooth-wheel 75 is arranged on a shaft 75'; on the shaft 75' is a sprocket 76 driven by a chain 77, the latter passing around a sprocket 78 on a stub shaft 79, on which shaft is another sprocket 79' driving a chain 80, which passes around a sprocket 80' on the shaft 40.

As the sliders pass downwardly through the magazine, it is desirable to position the same for riding over a rounded shoe 81 which conforms to the contour of the side edge of the slider so as to position the same in the manner illustrated in Figs. 1 and 16 of the drawing between a pair of pivoted jaws 82. Adjustably coupled with the jaws 82 is a spring 83 which normally supports the jaws in position engaging side surfaces of the slider, as shown in said figures.

Supported in connection with the magazine is another stub shaft 84 which is driven from a sprocket 85 having a chain 86 which passes around another sprocket on the shaft of the tooth-wheel 75. On the shaft 84 is an eccentric 84' which actuates a block 88 to which is pivoted a yoke-shaped end 89 of a pin 90. On the lower end of the pin is a seat 91, upon which seats the arm 92 of a workpiece or slider feed finger 93. On the pin 90 is a spring 94 which normally supports the finger in operative position for engagement with a slider. The end of the finger is recessed, as seen at 93', to span the upper, wide end of the slider. The finger 93 is pivoted, as seen at 95, in a forked end 96 of an arm 97, the arms, in turn, having an oscillatory mounting on a pin or bolt 98.

With this construction, it will appear that the slider feed finger 93 will have a substantially positive feed in the downward movement to force-feed the slider through the jaws 82. The jaws, swinging on their pivots against the action of the spring 83, thus free the slider 28 to drop into the lower perpendicular portion 69' of the magazine or chute. This feed to the chute may be such as to keep a constant supply in the section 69' of the chute.

After the slider has been delivered, the eccentric 84 moves the pin 99 upwardly and, in this operation, the finger is rocked on its pivot 95 to swing clear of the next successive slider and then to move downwardly upon this slider held in the jaws 82. It will, therefore, appear that an intermittent feed of the sliders, from the upper magazine into the lower vertical magazine, is provided. The sliders then drop to a final one by one feed mechanism at the lower portion of the magazine or chute 69'.

It will appear, from a consideration of Fig. 2, that the lower part of the magazine or chute is curved and the delivery referred to above comprises a dog-type escapement arm or member 99, pivoted to the chute, as seen at 100 (see Fig. 11). The member 99 has a socket end 101 adapted to engage individual sliders, so that the flange 101' holds the last slider as the member 99 is tripped by an air actuated plunger 102 and then releases the slider on return of the member 99 to normal position by a spring actuated plunger 103. Upon being released, the slider drops to the lower end of the chute and it is momentarily held in position by a pivoted gate portion 104 of the chute, which gate portion is swung into inoperative position by a delivery wiper 105 engaging the slider which delivers the slider 28 to the blade 106 of a channel-type rack 107.

The wiper 105 is secured to a pin or shaft 108, to which is secured a rocker arm 109. The arm is actuated through the medium of a long link 110, pivotally coupled to a cam actuated lever 111, pivoted as seen at 112. The lever 111 is actuated by a cam 113 on the cam shaft 35, note Fig. 2. In other words, in each cycle of operation of the machine, a single slider 28 is moved by the delivery wiper 105 into mounted position upon the blade 106, the slider 28 being seated for a fixed position on the edge of the blade by engagement with one of a number of V-shaped notches 114.

Mounted on the bed plate or table 25 of the machine is a long rack guide and supporting table 115 having longitudinally spaced base rollers 116 embedded therein for free movement of the rack 107, the rack being further guided by longitudinally spaced pairs of rollers 117. Any suitable means can be provided for delivery of the racks edge to edge over the table 115 or they can be fed by hand so as to maintain abutting engagement. It will be noted, from a consideration of Fig. 14, that end notches 114, on the blades 106 of the racks, are spaced a distance one-half the normal spacing of the grooves along the edge of the blades 106, so that, when the racks abut, a constant feed is provided between adjacent racks. It will also appear in Fig. 14 that the web 118 of the slider 28 engages the groove 114 in definitely positioning the slider on the blade 106.

On the shaft 45 are secured two arms 119 and 120, the arm 119 having pivoted therein a rack feed pawl 121 normally tensioned by a spring-pressed pin 122 for constant engagement with the upper edge of the blade 106 to engage the notches 114, while permitting relative movement of the blade with respect to the pawl.

Pivoted to the arm 120 is a sleeve 123 which is slidable on a rod 124 and held in different adjusted positions under the tension of a spring 125. The rod 124 has an enlarged disc head 126, which is actuated by an eccentric 127 on the crank shaft 35 so that, in each cycle of operation of the machine, the feed pawl 121 moves to the right, as seen in Fig. 1, to advance the bar 106 one step to bring the next successive notch 114 into position for receiving the next successive slider 28. The pawl 121 then returns to engage the next adjacent notch 114, preparatory to repeating the above operation.

The blade 106 is adjustably clamped in the rack 107 by a pair of clamping jaws 128 disposed angularly to the channel of the rack, as is clearly seen in Fig. 13 of the drawing, to dispose the blade 106 in a position directly alined with the discharge of the chute, so as to receive the successive sliders. The blade 106 passes through suitable tensioning means which comprises a fixed, but adjustable, member 129 and a spring actuated member 130 comprising a shoe, which is pivotally supported on an end of a lever 131, the other end of the lever sliding on a rod 132, on which is arranged a spring 133, the tension of which is adjusted by nuts 134, note Fig. 4. It will, thus, be apparent that the blade 106 is retained in fixed position, at all times, except in the positive feed thereof through the medium of the pawl 121.

The sliders 28 are delivered on the rack with the pulls 29 thereof disposed forwardly, as seen in Fig. 13. To facilitate application of coating materials, it is desirable to first lift the downwardly hanging pulls 29 to arrange the same in the raised position shown in Fig. 13, so that after the under-surfaces of the pulls are coated, they may be easily dropped to coat the outer surfaces thereof. This lifting of the pulls is accomplished by a long tapered finger 135 supported in one or more bracket arms 136 on the supplemental table 115.

As the bar 106 moves intermittently to the right and the pulls 29 pass over the finger 135, the pulls are gradually raised until they assume the position shown in Fig. 13.

Supported directly above the pawl 121 is a pawl tripping arm 137, pivoted as seen at 138, and normally held in inoperative position by a spring 139. The arm 137 is adapted to be moved into a lowered position by an air actuated plunger 140, so as to engage a roller 141 on the pivoted end portion of the pawl to depress this end portion against the action of the spring pin 122 to retain the pawl in raised inoperative position to prevent feed of the bar 106, notwithstanding the fact that the pawl is still reciprocating back and forth in its normal feed motion.

The arm 137 is made sufficiently long to retain the pawl in its inoperative position in the aforesaid operation of the delivery wiper 105, which is driven through the link 110 and other mechanism described. On the shaft 108 is arranged a valve-tripping or actuating arm 142, having an adjustable pin 143 at its free end. This pin is adapted to strike a plunger valve 144 of a valve casing 145 to move the same inwardly against the action of a spring 146 so as to admit air from a source of supply through a pipe 147 to pass through the valve casing 145 for discharge through the exhaust pipe 148 to extend to the casing 140', in which the plunger 140 is arranged. In other words, if the delivery wiper fails to engage a slider 28 at the discharge end of the magazine or chute, the wiper 105 will have an extended free motion, sufficient to actuate the plunger valve 144, thus allowing air to enter the casing 140' and, as a result, the pawl 121 is moved into the inoperative position, preventing feed of the blade 106.

Also, on the shaft 108 is an arm 149 which may comprise part of the lever 109 and, to this arm, is pivoted a long rod 150, having an adjustable trip-block 151 thereon and a spring 152 which normally supports the lever 111 in engagement with the cam 113. The spring operates upon a rod guide 153 supported on the magazine, as seen in Fig. 2 of the drawing.

Pivotally supported on the valve casing 145 is a catch device or dog 154, the offset or hook end 155 of which is normally supported out-of-engagement with a groove 144' in the valve 144 by engagement of the dog 154 with the block 151. However, when the feed wiper 105 is moved into operative position, the block 151 is moved out-of-engagement with the dog 154 and a spring 156 moves the projection 155 in position for engaging the groove 144', providing the valve 144 has been moved inwardly by the trip arm 142 to register the groove 144' with the projection 155.

The normal position of the plunger valve 144 is shown in Fig. 10 of the drawing, where communication of the air supply from 147 is cut off to the pipe 148 and the air is vented to atmosphere through the valve casing 145, as seen by the exhaust port 145'.

Arranged on the cam shaft 35 is a cam 157 for actuating an air valve 158 for admitting air to a valve casing 159, note Fig. 9, air being admitted to the casing, as indicated at 160 and, in the casing, is a spring controlled valve 161 which is normally held in open position by a lever 162 pivoted to the valve casing 159 and engaging the side surface of the rack 107, the lever having a roller 163 for free movement over the rack. It will be apparent that, if a rack end presents itself at the position of the lever 162, the spring-pressed valve 161 will be moved into an inoperative position to shut-off transmission of air to the discharge pipe 164 which leads to the plunger casing 102', in which the plunger 102 is arranged. In other words, normally air is intermittently supplied to the casing 102' by action of the cam 157 to control operation of the escapement arm 99. However, when racks cease to be fed into the machine or a rack end is reached, the escapement mechanism is rendered inoperative.

On the cam shaft 35 is another cam 165 which actuates another air valve 166 for controlling supply of air through a pipe 166' to the casing 73', in which the air actuated plunger 73 is arranged for operating the gate 72. On the cam shaft 35 is another cam 167 for actuating another air valve 168 which controls intermittent supply of air to the casings 68' through a pipe 168', in which the plungers 68 are employed. This controls operation of the stripper 67. It will be apparent that the timing of the respective cams 113, 157, 165 and 167 is such as to provide the synchronized operation of the various mechanisms such as the delivery wiper, the escapement mechanism and the gate and strippers for continued operation of the machine, the automatic controls insofar as final delivery of the sliders to the rack being controlled by the other air valve mechanisms employed.

One end of the cam shaft includes a wheel 169, by means of which the cam shaft can be operated from time to time when the power is shut off to the drive motor of the machine.

Arranged on the cam shaft 35 is a suitable clutch mechanism, generally identified by the reference character 170, for coupling the drive of the sprocket 37 with the cam shaft. A suitable handle 171 will be provided for moving the clutch into operative and inoperative positions. It will be understood that the clutch normally idles on the shaft until the clutch mechanism is thrown into engaging position, at which time, the cam shaft is operated which will drive the several mechanisms of the machine, as commonly known in the arts.

It will be understood that, while I have illustrated my invention as applied to the racking of specific devices such as sliders for separable fastener stringers, the machine is applicable for racking other devices for the purpose of spacing them along a mounting member or rack blade to support the devices in the operation of enameling or otherwise coating the same. In different devices, the structure of the magazine and other parts, which directly engage the devices, will be modified to suit the varying structures in the devices.

Considering Figs. 18 and 19 of the drawing, it will appear that the sliders 28 drop into the nest formed between the guide jaws 82, where they are held preparatory to being delivered to the chute 69'. The jaws 82 support each slider for proper feed onto the chute 69', so that the flanged inner edge portion 69" of the chute 69' will enter the channel 30 of the slider, as clearly seen in Fig. 19 and the web 118 of the slider is disposed between the inner flanged ends 69". This construction maintains the slider in proper position at all times to the point of delivery to the rack blade 106. It will appear from Fig. 18 that the inturned flanges 30' of the slider walls engage the flanges 69" which prevents rocking or tilting movement of the slider as it moves along the chute 69'. This type of delivery insures a definite positioning of a slider at the discharge or delivery end of the chute for engagement with the rack blade. In fact, this particular feed can be utilized in any type of machine, where it is desirable to control delivery of a channeled body, such as a slider to a predetermined station.

Considering Figs. 16 and 18, it will appear that the arms or jaws 82 are held in their position, forming the nest or seat by the stop screws 172, which bear against stops 173. These screws are adjusted to accommodate different workpieces.

It will be apparent that the supports for the spring 83 are such as to maintain the spring beyond the limits of the slider pull so that the pull is free to pass onto the chute 69' of the magazine.

The operation of the machine will be readily understood from the foregoing description, when taken in conjunction with the accompanying drawings and the following statement.

Tracing the cycle from the point of picking up a slider from the container, the slider is first delivered to the upper end of the magazine and it is then actuated by the tooth-wheel 75 for proper alinement and positioning before passing over the rounded surface 81 for straightening and again positioning the slider for transmission to the first stop position on the magazine. This position is at the spring tensioned arms or jaws 82. From this position, the slider is positively delivered into the magazine, or chute section 69', by the finger 93.

The magazine 69' momentarily stores the sliders and the sliders are then positively delivered one by one by the delivery or escapement mechanism comprising the arm 99 in timed relation with the operation of the rack 107 which is intermittently fed step by step in each cycle of operation of the machine to bring successive notches 114 into position to receive successive sliders 28. The wiper delivery comprising the wiper finger 105 controls the final delivery of the slider to its position on the rack blade 106. If by any chance a slider should not be in the position for the final delivery, the delivery wiper arm will swing, carrying with it the trip arm 142 which will control automatic stoppage of the rack feed as heretofore set forth.

As the operations of the machine continue, the rack end reaches the station having the automatic stop control mechanism comprising the arm 162 and its roller 163. If another rack has not been positioned for feed into the machine and assumed an abutting relationship with the filled rack, then this mechanism will function to shut off the supply of air to the escapement or delivery arm 99, thus stopping delivery of sliders to the final wiper feed station. As long as successive racks are maintained in the machine, an uninterrupted feed and delivery of devices to the racks will be maintained.

In the intermittent feed of the rack or racks, it will be apparent that the feed pawl 121 engages the V-shaped notches 114 of the rack blade 106 in producing the desired feed and this provides a positive control of feed motion of the rack. Friction means is provided as above stated for retaining the rack constantly in fixed position, so that the rack is movable only upon the force-feed by the feed pawl, otherwise the rack is retained against movement in either direction by said means.

Having fully described my invention, what I claim as new and desire to secure by Letters Patent is:

1. In a machine for delivering objects having different surface characteristics on their front and back faces in a uniform manner to a discharge point where each article is delivered in a uniform position, the combination which includes a hopper containing a supply of said articles, a reciprocable blade mounted in the hopper, said blade being reciprocable between a position in said hopper where the blade engages with and picks up articles in the hopper at random and an upper position, a stripper positioned adjacent one side of said blade at said upper position, means for moving said stripper into engagement with the surfaces of articles facing in one direction on said blade, the stripper lifting the articles facing in said one direction from the blade upon movement of the blade downward from its upper position, a delivery chute, said chute having one end thereof adjoining one end of said blade at a point intermediate the upper and lower positions of the blade for receiving articles facing in a second direction from the blade, a discharge gate located between the end of the blade and the delivery chute, and means for opening said discharge gate upon downward movement of the blade.

2. In a machine for delivering objects having different surface characteristics on their front and back faces in a uniform manner to a discharge point where each of the articles is delivered in a uniform position, the combination which includes a hopper containing a supply of said articles, a reciprocable blade mounted in the hopper, said blade being reciprocable between a position in said hopper where the blade engages with and picks up articles in the hopper at random and an upper position, a stripper positioned adjacent one side of said blade at said upper position, means for moving said stripper into engagement with the surfaces of articles facing in one direction on said blade, the stripper lifting the articles facing in one said direction from the blade upon movement of the blade downward from its upper position, a delivery chute, said chute having one end positioned at one end of said blade at a point intermediate the upper and lower positions of the blade, said chute receiving articles facing in a second direction from the blade, a discharge gate located between the end of the blade and the delivery chute, means for opening said discharge gate upon downward movement of the blade, a discharge magazine located at the discharge end of said delivery chute, said magazine including means for engaging with and holding the articles received from the delivery chute in uniform position and means for aligning said articles in said chute for engagement with the article engaging means in the magazine as the articles pass from the delivery chute to the magazine.

3. In a machine for delivering objects having different surface characteristics on their front and back faces in a uniform manner to a discharge point where each of the articles is delivered in a uniform position, the combination which includes a hopper containing a supply of the articles, a reciprocable inclined blade mounted in the hopper, said blade being reciprocable between a position in said hopper where the blade engages with and picks up articles in the hopper at random and an upper position, a stripper positioned adjacent one side of said blade at said upper position, means for moving said stripper into engagement with the surfaces of articles facing in one direction on said blade, said stripper lifting the articles facing in said one direction from the blade upon movement of the blade downward from its upper position, a pair of spaced rails forming a delivery chute, said delivery chute sloping downwardly and having one end located at one end of said blade at a point intermediate the upper and lower positions of the blade, said chute receiving articles carried on said blade facing in a second direction, a discharge gate located between the end of the blade and the delivery chute, means for opening said discharge gate upon downward movement of the blade, a discharge magazine located at the lower end of the delivery chute, said magazine including a pair of spaced rail-like members, said rail-like members engaging with and holding articles fed from said delivery chute to said discharge magazine in a uniform position in the magazine, and releasable members engaging with and positioning said articles in alignment with said rail-like members as the articles pass from the delivery chute to the discharge magazine.

4. In a machine for feeding articles having channeled openings therein such as slider bodies from a container containing a supply of said articles to one end of a delivery chute and delivering said articles in uniform positions at the other end of said chute at spaced intervals along an article-supporting member, the combination of an inclined blade located within the container, said blade being vertically reciprocable between a position in the container at which articles are engaged and picked up thereby and a raised position at which said blade communicates with and delivers the articles on the blade to one end of the delivery chute, means associated with the delivery chute for positioning the articles therein, said article-positioning means including a contoured member resiliently engaging with the surface of each article in its passage through the chute and positioning the articles engaged thereby uniformly with respect to each other in the chute, means for moving the articles past said positioning means and means for feeding the uniformly positioned articles from the discharge end of the chute at timed intervals to an article-supporting member.

5. In a machine for feeding articles having channeled openings therein such as slider bodies from a container containing a supply of said articles to one end of a delivery chute and delivering said articles in uniform positions at the other end of said chute at spaced intervals along an article-supporting member, the combination of an inclined blade located within the container, said blade being vertically reciprocable between a position within the container at which articles are engaged and picked up thereby and a position at which said blade communicates with and delivers the articles engaged thereby by gravity to the delivery chute, means associated with the delivery chute for positioning the articles therein, said article-positioning means including a contoured member resiliently engaging with the surface of each article in its passage through the chute and positioning the articles engaged thereby uniformly with respect to each other in the chute, a magazine portion of the chute positioned to receive articles from said article-positioning means, said magazine portion engaging with and maintaining the articles received therein in said uniform position in their passage to the discharge end of the chute, means for moving the articles past said contoured member and means for feeding the uniformly positioned articles from the discharge end of the magazine portion of the delivery end of the chute at timed intervals to an article-supporting member.

6. In a machine for feeding articles having a slotted opening therein from a hopper containing a supply of said articles to one end of a delivery chute and delivering said articles in uniform positions at the other end of said chute at spaced intervals along an article-supporting member, the combination as defined in claim 5 wherein the magazine portion of the chute includes a pair of spaced rails, at least one of said rails being shaped to fit the channeled openings in the articles.

7. In a machine for feeding articles having channeled openings therein and different surface characteristics on opposite sides thereof such as slider bodies from a container containing a supply of such articles to one end of a delivery chute and discharging said articles in uniform positions from the other end of said chute at spaced intervals along an article-supporting member, the combination of an inclined blade located inside of the container, said blade being vertically reciprocable between a lowered position within the container at which articles are engaged at random thereby and a raised position, stripping means movable toward and away from the blade at the raised position thereof, said stripping means being located at one side of the inclined blade and being movable toward the blade for engagement with and removal from the blade of articles facing in one direction on the blade upon downward movement of the blade, the container having a discharge exit communicating with one end of the delivery chute and with the inclined blade at a point intermediate the raised and lowered positions of the blade, a gate at said exit for controlling the movement of articles from the blade to the delivery chute, said gate being movable for permitting articles facing in the other direction from said one direction on the blade to pass by gravity into said chute, means for positioning articles in said chute, said article-positioning means including a contoured member resiliently engaging with the surface of each article in its passage through the chute and positioning the article engaged thereby uniformly with respect to each other prior to the movement of said article to the discharge end of the chute, means for moving the articles past said contoured member and means for feeding the uniformly positioned articles from the discharge end of the chute at timed intervals to an article-supporting member.

8. In a machine for feeding articles having channeled openings therein and a projection on one side thereof from a container containing a supply of such articles to one end of a delivery chute and discharging said articles at the other end of the chute in uniform positions at spaced intervals along an article-supporting rack at the other end of said chute, the combination of an inclined blade reciprocably mounted in the container, said blade being vertically reciprocable between a lowered position within the container at which articles in the container are engaged and picked up by the blade and a raised position, a movable stripping bar located on one side of the blade at the raised position thereof, means for moving the stripping bar toward the blade for engagement with the projections on the sides of articles facing in one direction on the blade upon downward movement of the blade and removing said articles from the blade, the container having a discharge exit communicating with one end of the delivery chute and the inclined blade at a point intermediate the raised and lowered positions thereof, means at said exit for controlling the movement by gravity of articles from the inclined blade to the delivery chute, a contoured stop resiliently engaging with the surfaces of articles passing through the chute, said stop being shaped to position said articles uniformly in the chute, a magazine portion of said chute positioned beneath said stop, said magazine portion receiving positioned articles from said stop and including means for maintaining the positioned articles in uniform position with respect to other articles in said magazine, means associated with said stop for engaging with and forcing the article positioned thereby past the stop and into the magazine portion of the chute and means for feeding the uniformly positioned articles at timed intervals from the discharge end of the magazine to an article-supporting rack.

9. In a machine for delivering channeled articles such as slider bodies from a container containing a supply of the articles to a delivery chute with the delivered articles facing in a uniform direction, the combination which includes an article pick-up and delivery mechanism located within the container, said mechanism including a vertically reciprocable blade, said blade being shaped to engage with channels in the articles in the container and being reciprocable between a position within the container where said articles are picked up at random from the supply within the container and a raised position, a stripper element movable toward and away from the blade at the raised position thereof, said stripper element being movable toward the blade for engagement with and removal of articles facing in one direction on the blade upon downward movement of the blade from the raised position thereof, and means for controlling the movement of articles from the blade to the delivery chute, said last-mentioned means being actuated to release articles facing in the other direction on the blade to the delivery chute at a point intermediate the raised and lowered positions of the blade.

10. In a machine for delivering channeled articles such as slider bodies from a container containing a supply of the articles to a delivery chute with the delivered articles facing in a uniform direction, the combination which includes an article pick-up and delivery mechanism located within the container, said mechanism including a vertically reciprocable blade, said blade being shaped to engage with channels in the articles in the container and being reciprocable between a position within the container where said articles are picked up at random from the supply within the container and a raised position, a stripper element movable toward and away from the blade at the raised position thereof, said stripper element being movable toward the blade for engagement with and removal of articles facing in one direction on the blade upon downward movement of the blade from the raised position thereof, means for controlling the movement of articles from the blade to the delivery chute, said last-mentioned means being actuated to release articles facing in the other direction on the blade to the delivery chute at a point intermediate the raised and lowered positions of the blade, and article-positioning means associated with the delivery chute, said article-positioning means engaging with and aligning the articles passing through the chute in uniform positions therein.

11. In a machine for delivering channeled articles such as slider bodies from a container containing a supply of the articles to a delivery chute with the delivered articles facing in a uniform direction, the combination which includes an article pick-up and delivery mechanism located within the container, said mechanism including a vertically reciprocable blade, said blade being shaped to engage with channels in the articles in the container and being reciprocable between a position within the container where said articles are picked up at random from the supply within the container and a raised position, a stripper element movable toward and away from the blade at the raised position thereof, said stripper element being movable toward the blade for engagement with and removal of articles facing in one direction on the blade upon downward movement of the blade from the raised position thereof, and means for controlling the movement of articles from the blade to the delivery chute, said last-mentioned means being actuated to release articles facing in the other direction on the blade to the delivery chute at a point intermediate the raised and lowered positions of the blade, article-positioning means associated with the delivery chute intermediate the ends thereof, said article-positioning means engaging with and aligning the articles passing through the chute in uniform positions therein, and means for releasing the uniformly positioned articles to the discharge end of the chute one at a time.

12. In a machine for delivering channeled articles such as slider bodies from a container containing a supply of the articles to a delivery chute with the delivered articles facing in a uniform direction, the combination which includes an article pick-up and delivery mechanism located within the container, said mechanism including a vertically reciprocable blade, said blade being shaped to engage with channels in the articles in the container and being reciprocable between a position within the container where said articles are picked up at random from the supply within the container and a raised position, a stripper element movable toward and away from the blade at the raised position thereof, said stripper element being movable toward the blade for engagement with and removal of articles facing in one direction on the blade upon downward movement of the blade from the raised position thereof, and means for controlling the movement of articles from the blade to the delivery chute, said last-mentioned means being actuated to release articles facing in the other direction on the blade to the delivery chute at a point intermediate the raised and lowered positions of the blade, article-positioning means associated with the delivery chute intermediate the ends thereof, said article-positioning means engaging with and aligning the articles passing through the chute in uniform positions therein, means for releasing the uniformly positioned articles to the discharge end of the chute one at a time and a wiper discharge element located at the discharge end of the chute, said element engaging with and discharging the uniformly positioned, released articles from the chute.

13. In a machine for delivering articles having channels in the sides thereof from a hopper containing a supply of such articles to a discharge point with said articles being uniformly positioned at said discharge point, the combination which includes a pair of downwardly inclined guide members, said members being spaced apart and communicating with a discharge opening in a hopper, at least one of said guide members being shaped to fit into a channel in one side of articles passing between said members, a second pair of downwardly inclined guide members joining the lower ends of said first-mentioned members, said second pair of guide members being spaced apart and communicating with the first-mentioned pair of guide members to receive articles therefrom and having their opposing edges shaped to conform to the shape of the channels in the sides of the channeled articles, a pair of opposing stops movably mounted at the lower ends of the first-mentioned pair of guide members, said stops having opposing surfaces contoured to conform to the outer surface of the channeled articles and being resiliently urged into engagement therewith for aligning the articles with the second pair of guide members and means for releasing the channeled articles from engagement with said stops for passage thereof from the first pair of guide members to the second pair of guide members.

14. In a machine for delivering articles having channels in the sides thereof, the combination as defined in claim 13 wherein the means for releasing the channeled articles from engagement with the contoured stops includes a movable finger, said finger being movable into and out of engagement with articles held by the stops and lengthwise with respect to the stops.

15. In a machine for delivering articles having channels in the sides thereof from a hopper containing a supply of such articles to a discharge point with said articles being uniformly positioned at said discharge point, the combination which includes a pair of downwardly inclined guide members, said members being spaced apart and communicating with a discharge opening in a hopper, at least one of said guide members being shaped to fit into a channel in one side of articles passing between said members, a second pair of downwardly inclined guide members joining the lower ends of said first-mentioned members, said second pair of guide members being spaced apart and communicating with the first-mentioned pair of guide members to receive articles therefrom and having their opposing edges shaped to conform to the shape of the channels in the sides of the channeled articles, a pair of opposing stops movably mounted at the lower ends of the first-mentioned pair of guide members, said stops having opposing surfaces contoured to conform to the outer surface of the channeled articles and being resiliently urged into engagement therewith for aligning the articles with the second pair of guide members, means for releasing the channeled articles from engagement with said stops for passage thereof from the first pair of guide members to the second pair of guide members and means located intermediate the ends of said second pair of guide members for engaging with and releasing articles passing therebetween at timed intervals to the discharge ends of said second pair of guide members.

16. In a machine for delivering articles having channels in the sides thereof from a hopper containing a supply of such articles to a discharge point with said articles being uniformly positioned at said discharge point, the combination which includes a pair of downwardly inclined guide members, said members being spaced apart and communicating with a discharge opening in a hopper, at least one of said guide members being shaped to fit into a channel in one side of articles passing between said members, a second pair of downwardly inclined guide members joining the lower ends of said first-mentioned members, said second pair of guide members being spaced apart and communicating with the first-mentioned pair of guide members to receive articles therefrom and having their opposing edges shaped to conform to the shape of the channels in the sides of the channeled articles, a pair of opposing stops movably mounted at the lower ends of the first-mentioned pair of guide members, said stops having opposing surfaces contoured to conform to the outer surface of the channeled articles and being resiliently urged into engagement therewith for aligning the articles with the second pair of guide members, means for releasing the channeled articles from engagement with said stops for passage thereof from the first pair of guide members to the second pair of guide members, means located intermediate the ends of said second pair of guide members for engaging with and releasing articles passing therebetween at timed intervals to the discharge ends of said second pair of guide members and control means for rendering said last-mentioned means operative upon delivery of one of the articles to the discharge end of said second pair of guide members.

17. In a machine for delivering channeled articles from a hopper containing a supply of such articles to a discharge point at which said articles are uniformly positioned, the combination which includes a pair of downwardly inclined members, said members being spaced apart and communicating at the upper ends thereof with a discharge opening in the hopper, at least one of said members being shaped to fit into a channel in the articles for supporting said articles in their movement between said guide members, means for orienting the articles in a common direction on said last-mentioned member, a second pair of downwardly inclined guide members communicating at their upper ends with the lower ends of the first-mentioned pair of guide members, said second pair of guide members being spaced apart and having their opposing edges shaped to conform to the shape of the channels in the articles being delivered, a pair of opposing stops movably mounted at the lower ends of the first-mentioned pair of guide members, said stops having opposing surfaces contoured to conform to the outer surface of the articles being delivered and being resiliently urged into engagement with the articles passing between the first-mentioned members with the second pair of members and means for releasing the articles from engagement with said stops and moving the articles onto said second pair of guide members.

18. In a machine for delivering articles having channels on the sides thereof and different surface characteristics on the fronts and backs thereof in a uniform position to a discharge point wherein said articles are picked up at random from a hopper containing a supply of said articles by a vertically reciprocable pick-up member and are fed from said member to a delivery chute, the combination of a movable stripper located adjacent said reciprocable pick-up member at a raised position thereof, said stripper being movable toward said pick-up member and into position for engagement with a projection on one surface of the articles thereon upon downward movement of the reciprocable member and means for releasing channeled articles facing in an opposite direction from said reciprocable pick-up member to a delivery chute at a lowered position of the pick-up member.

LOUIS H. MORIN.

References Cited in the file of this patent
UNITED STATES PATENTS

| Number | Name | Date |
|---|---|---|
| 277,985 | Bray | May 22, 1883 |
| 502,895 | Van Norman | Aug. 8, 1893 |
| 1,311,590 | Bingham | July 29, 1919 |
| 1,533,180 | Goldberg | Apr. 14, 1925 |
| 1,578,392 | Cadden | Mar. 30, 1926 |
| 1,609,994 | Ellis | Dec. 7, 1926 |
| 1,632,852 | Richter | June 21, 1927 |
| 1,793,285 | Hambleton et al. | Feb. 17, 1931 |
| 1,857,815 | Lafferty | May 10, 1932 |
| 1,973,720 | Lockie | Sept. 18, 1934 |
| 2,004,464 | Clarkson | June 11, 1935 |
| 2,198,949 | Redman | Apr. 30, 1940 |
| 2,244,667 | Banning | June 10, 1941 |
| 2,264,468 | Alexander | Dec. 2, 1941 |